United States Patent [19]

Maruhashi et al.

[11] Patent Number: 5,250,335
[45] Date of Patent: Oct. 5, 1993

[54] POLYESTER VESSEL FOR DRINK AND PROCESS FOR PREPARATION THEREOF

[75] Inventors: Yoshitsugu Maruhashi; Setsuko Iida, both of Yokohama, Japan

[73] Assignee: Toyo Seikan Kaisha, Ltd., Tokyo, Japan

[21] Appl. No.: 542,143

[22] Filed: Jun. 22, 1990

[30] Foreign Application Priority Data

Jun. 23, 1989 [JP] Japan .................................. 1-159429
Jun. 23, 1989 [JP] Japan .................................. 1-159430

[51] Int. Cl.$^5$ .......................... B65D 1/02; B29C 49/08
[52] U.S. Cl. .................................. 428/36.92; 215/1 C; 428/910
[58] Field of Search ....................... 428/36.92, 910; 215/1 C; 264/521, 212, 480

[56] References Cited

U.S. PATENT DOCUMENTS

| | | | |
|---|---|---|---|
| 4,571,173 | 2/1986 | Chang et al. | 432/9 |
| 4,803,036 | 2/1989 | Maruhashi et al. | 264/526 |
| 4,913,945 | 4/1990 | Maruhashi et al. | 428/36.92 |

*Primary Examiner*—George F. Lesmes
*Assistant Examiner*—Charles R. Nold
*Attorney, Agent, or Firm*—Sughrue, Mion, Zinn, Macpeak & Seas

[57] ABSTRACT

In preparing a draw-blow-formed polyester vessel, the inner surface and outer surface temperatures of a starting preform are adjusted at specific levels at the preliminary heating step, and the drawing speed in the circumferential direction is adjusted at a level of at least 350%/sec and a specific relation is established between the area draw ratios on the inner and outer surface sides at the draw-blowing step. A polyester vessel having a reduced shrinkage with time and a high pressure-resistant strength is obtained according to this process.

1 Claim, 2 Drawing Sheets

POLYESTER VESSEL FOR DRINK AND PROCESS FOR PREPARATION THEREOF

BACKGROUND OF THE INVENTION (1) Field of the Invention

The present invention relates to a polyester vessel for a drink and a process for the preparation thereof. More particularly, the present invention relates to a draw-blow-formed vessel which has a reduced shrinkage with time and is excellent in mechanical strength characteristics such as the pressure-resistant strength, and a process for the preparation thereof.

(2) Description of the Related Art

A biaxially drawn blow-formed vessel of a thermoplastic resin such as polyethylene terephthalate (PET) has excellent transparency and surface gloss and has properties required for a bottle, such as a good impact resistance, a high rigidity and a good gas-barrier property. Accordingly, this vessel is widely used for bottling various drinks.

In the production of a draw-blow-formed PET vessel, in general, a PET resin is injection-molded into a substantially amorphous bottomed preform, the bottomed preform is preliminarily heated at a drawing temperature, the preliminarily heated preform is stretched and drawn in the axial direction by a drawing rod while holding the preform in a split mold, and simultaneously, the preform is drawn in the circumferential direction by blowing a fluid into the preform. It is known that in order to prevent thermal shrinkage of the barrel of the vessel, the biaxially drawn vessel is thermally set according to need.

Preliminary heating of the preform is generally performed by supporting the preform by a mandrel or the like and irradiating the preform from the outer surface side with infrared rays. In this case, the temperature on the outer surface side of the perform is higher than the temperature on the inner surface side, and in order to avoid this phenomenon, it is necessary that uniform heating should be conducted for an extremely long time or a particular uniformalizing region should be disposed for eliminating the temperature difference between the outer surface side and inner surface side.

As the means for overcoming this disadvantage, there is known a method in which the preform is heated either from the inner surface side or from the outer surface side to uniformalize the temperature and shorten the heating time. For example, Japanese Examined Patent Publication No. 62-42852 teaches a method in which a layer of a heat-insulating material capable of generating heat under irradiation with far infrared rays is arranged on the periphery of a core shaft to be inserted into the interior of the perform and the preform is heated from the interior. Furthermore, Japanese Unexamined Patent Publication No. 62-77919 teaches that a radiation distribution suitable for heating a parison is obtained by forming a large-diameter portion at the end of a rod-shaped heater to be inserted into the interior of the parison. Moreover, Japanese Unexamined Patent Publication No. 61-163828 discloses a method in which a preform is heated from the outer side in a heating furnace and simultaneously, the preform is heated from the interior by a heat pipe inserted into the preform.

The above-mentioned conventional heating method comprising heating a preform the outer surface side and from the inner surface side is satisfactory in attaining the object of uniformalizing the temperature on the inner surface side and outer surface side and shortening the heating time, but the draw-blow-formed vessel actually prepared according to this method comes to have a large creep and is defective in that the pressure-resistant strength is considerably reduced, though the shrinkage with time is small.

A non-heat-set biaxially drawn polyester vessel according to the above-mentioned former conventional method has an excellent pressure-resistant strength, but the inner volume diminishes with the lapse of time and an inner volume necessary for filling a content cannot be ensured. Namely, this vessel is not satisfactory in the resistance to shrinkage with time.

A heat-set, biaxially drawn polyester vessel according to the latter conventional method is thermally dimensionstable and is excellent in the resistance to shrinkage with time, but the method is defective in that a heat-setting operation is necessary in addition to the blow-draw-forming operation, the mold occupancy time is long and another mold becomes necessary the heat setting, and therefore, the productivity is low and the manufacturing cost increases. For these reasons, a heat-set, biaxially drawn polyester vessel is used in the field where a content such as juice or oolong tea is hot-filled or heat-sterilized, but it is not used for carbonated drinks and the like.

Accordingly, in the field of vessels for carbonated refreshing drinks, development of a biaxially drawn polyester vessel having a pressure-resistant strength comparable or superior to that of the non-heat-set, biaxially drawn polyester vessel and having a shrinkage with time, which is controlled to a very low level without the heat-setting operation, is eagerly desired.

SUMMARY OF THE INVENTION

It is therefore a primary object of the present invention to provide a process for the preparation of a draw-blow-formed polyester vessel having a small shrinkage with time and a high pressure-resistant strength in combination.

Another object of the present invention is to provide a process for the preparation of a draw-blow-formed polyester vessel, in which the time required for preliminarily heating a preform is drastically shortened and the productivity of the entire process is extremely increased.

Still another object of the present invention is to provide a process for the preparation of a draw-blow-formed vessel which is advantageously applied to filling of drinks, especially carbonated drinks.

A further object of the present invention is to provide a polyester vessel having a small shrinkage with time and a high pressure-resistant strength in combination.

A still further object of the present invention is to provide a draw-blow-formed polyester vessel which is advantageously applied to filling of drinks, especially carbonated drinks.

In accordance with one aspect of the present invention, there is provided a process for the preparation of a polyester vessel, which comprises heating a preform composed of a thermoplastic polyester so that the inner surface temperature ($T_i$) and the outer surface temperature ($T_o$) satisfy the following requirements:

$$T_i \geq 85° C. \tag{1}$$

$$T_o \leq 105° C. \tag{2}$$

and $$10°C. \geq To - Ti > 0°C. \quad (3),$$

and subjecting the heated preform in a hollow mold to stretch drawing in the axial direction and expansion drawing in the circumferential direction so that the drawing speed in the circumferential direction is at least 350%/sec and the drawing deflection ratio (D) defined by the following formula:

$$D = \frac{Di - Do}{Di} \times 100 \quad (4)$$

wherein Di represents the area draw ratio of the inner surface of the perform and Do represents the area draw ratio of the outer surface of the preform, is in the range of from 20 to 40%.

In the present invention, it is preferred that the preform composed of a thermoplastic polyester be heated by an inner heater and an outer heater.

In accordance with another aspect of the present invention, there is provided a polyester vessel comprising a neck, a barrel and a closed bottom, which is prepared by draw-blow-forming of a thermoplastic polyester, wherein the inner surface and outer surface of the barrel have an orientation satisfying the following requirements:

$$1.500 \geq ni \geq 1.492 \quad (5),$$

and $$0.020 \geq no - ni \geq 0.010 \quad (6)$$

wherein no represents the refractive index of the outer surface side of the barrel in the thickness direction, determined by using NaD rays, and ni represents the refractive index of the inner surface side of the barrel in the thickness direction, determined by using NaD rays, and a crystallinity satisfying the following requirements:

$$35\% \geq Xi \geq 20\% \quad (7),$$

and $$3\% \geq Xi - Xo > 0\% \quad (8)$$

wherein Xo represents the crystallization degree of the outer surface side of the barrel, determined by the density method, and Xi represents the crystallization degree of the inner surface side of the barrel, determined by the density method.

DETAILED DESCRIPTION OF THE INVENTION

Figure 1:
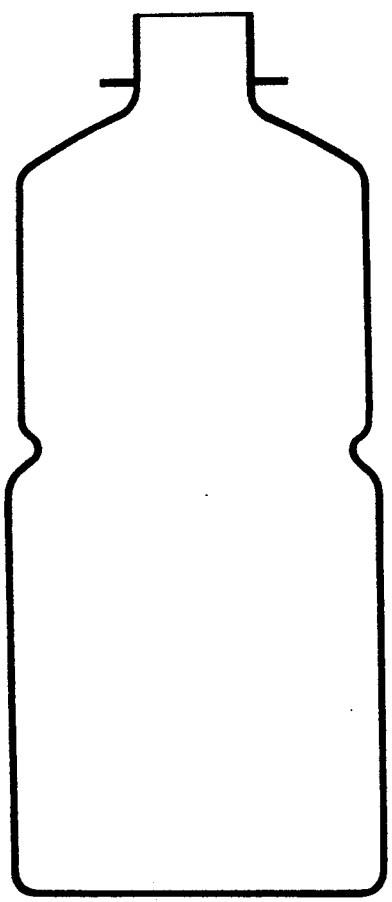
FIGS. 1 and 2 are diagrams showing examples of the shape of the bottle of the present invention.

In the preparation process of the present invention, a preform of a thermoplastic polyester is heated from both the surface sides by an inner heater and an outer heater. The first characteristic feature of the present invention is that the heating is carried out so that the outer surface temperature (To) is higher than the inner surface temperature (Ti) to such an extent as satisfying the requirements of formulae (1), (2) and (3) simultaneously. The reason why the inner surface temperature (Ti) is defined to satisfy the requirement of formula (1) is that if Ti is lower than 85° C., microcracks are formed in the final vessel and the transparency is degraded, and the strength of the vessel is reduced. The reason why the outer surface temperature (To) is defined to satisfy the requirement of formula (2) is that if To is higher than 105° C., thermal crystallization is caused in the polyester at the preliminary heating is degraded and the molecular orientation is relaxed, with the result that the improvement of the strength by drawing cannot be expected. The reason why the temperature difference specified by formula (3) is produced between the outer surface temperature and the inner surface temperature is that a balance giving a highest resistance to the shrinkage with time and a highest pressure-resistant strength can be attained, also relatively to the subsequent draw-forming operation, if this requirement is satisfied.

In the conventional draw-blow-forming of a plastic preform, since the draw ratio of the inner surface side is higher than that of the outer surface side, in order to attain an equivalent molecular orientation in both of the inner and outer surface sides, a temperature gradient is generally given such that the temperature (Ti) of the inner surface of the preform is higher than the temperature (To) of the outer surface of the preform (see, for example, Japanese Unexamined Patent Publication No. 49-103956, page 4, left lower column, and Japanese Unexamined Patent Publication No. 58-167127, page 5, right upper column).

In contrast, according to the present invention, contrary to this technical common sense, a temperature gradient is given to a preform such that the outer surface temperature (To) is higher than the inner surface temperature (Ti). The reason is that under the draw-blow-forming conditions adopted in the present invention, internal heat generation is caused on the inner surface side of the preform and appropriate molecular orientation and crystallization can be attained while moderating the strain.

In the case where the outer surface temperature (To) is equal to or lower than the inner surface temperature (Ti), by influences of internal heat generation at the draw-blow-forming, the molecular orientation of the resin on the inner surface side is excessively moderated, and the creep is increased and the pressure-resistant strength is drastically reduced.

If the value of (To−Ti) exceeds 10° C., the residual strain of the resin on the inner surface side is increased inspite of heat generation at the draw-forming step, and therefore, the shrinkage with time becomes large. In the present invention, the value of (To−Ti) is preferably in the range of from 0° to 10° C.

The second characteristic feature of the preparation process of the present invention is that stretch drawing in the axial direction and expansion drawing in the circumferential direction are carried out so that the drawing speed in the circumferential direction is at least 350%/sec, especially at least 450%/sec, and the drawing deflection ratio (D) defined by formula (4) is 20 to 40%, especially 25 to 35%.

In general, between the drawing speed of a thermoplastic polyester and the heat generation (internal heat generation) by internal friction and crystallization, there is observed a tendency that if the drawing speed exceeds a certain point, elevation of the temperature by internal heat generation becomes abruptly violent. The reason why the drawing speed is controlled within the above-mentioned range in the present invention is that the elevation of the temperature by internal heat generation is conspicuous within this range and the temperature is generally elevated by 10° to 30° C.

The drawing deflection ratio (D) defined by the above-mentioned formula (4) is the percental value obtained by normalizing the difference between the area drawn ratio of the inner surface of the preform and the area draw ratio of the outer surface of the preform by the are draw ratio of the inner surface with respect to a certain preform and a vessel formed therefrom. In general, the value (D) is larger than 0 but smaller than 100.

This drawing deglection ratio (D) has a relation to not only internal heat generation of the resin on the inner surface side but also molecular orientation of the resin on the inner surface side, and the larger is the value (D), the larger is internal heat generation and the higher is the degree of molecular orientation. Since internal heat generation becomes large, the moderation of orientation is simultaneously advanced. Accordingly, there is a certain optimum range of the value (D) with respect to the resistance to shrinkage with time and the pressure-resistant strength.

Namely, if the drawing deflection ratio (D) is too low and below this range, the moderation of orientation of the resin on the inner surface side is insufficient and the crystallinity is not improved, and therefore, the shrinkage with time tends to increase. On the other hand, if the drawing deflection ratio (D) exceeds the above range, the moderation of orientation of the resin on the inner surface side becomes too large and the pressure-resistant strength of the vessel tends to decrease.

In the present invention, it also is important that the draw-blow-forming should be carried out so that the obtained draw-blow-formed vessel has such orientation and crystallinity as satisfying the following requirements.

Namely, it is important that the draw-blow-forming should be carried out so that in the barrel of the obtained draw-blow-formed vessel, the refractive index (no) of the outer surface side in the thickness direction and the refractive index (ni) of the inner surface side in the thickness direction satisfy the following requirements:

$$1.500 \geq ni \geq 1.492 \quad (5),$$

and $$0.020 \geq no - ni \geq 0.010 \quad (6)$$

and the crystallinity (Xo) of the outer surface side of the barrel and the crystallinity (Xi) of the inner surface side of the barrel satisfy the following requirements:

$$35\% \geq Xi \geq 20\% \quad (7),$$

and $$3\% \geq Xi - Xo > 0\% \quad (8).$$

The pressure-resistant strength and the resistance to shrinkage with time in a vessel prepared by draw-blow-forming of a thermoplastic polyester have close relations to the orientation and crystallinity of the inner and outer surfaces of the barrel of the vessel. The present invention is based on the finding that if the orientation and crystallinity of the inner and outer surfaces of the barrel of the vessel are set so that the requirements represented by formulae (5), (6), (7) and (8) are satisfied, an optimum combination of the pressure-resistant strength and the small shrinkage with time can be obtained.

The refractive index in the thickness direction, referred to in the instant specification and appended claims, is the value obtained by performing the measurement by using NaD rays as the light source, an Abbe refractometer as the refractometer and a polarizing plate, making light incident in parallel to the sample surface and setting the polarizing plate so that the polarizing direction of the polarizing plate is in agreement with the thickness direction. It is meant that the larger is the refractive index in the thickness direction, the smaller is the orientation degree in the plane direction (axial direction and circumferential direction) of the sample, and in contrast, the smaller is the refractive index in the thickness direction, the larger is the orientation degree in the plane direction of the sample.

In the case where the refractive index ni on the inner surface side is larger than the upper limit of formula (5), the degree of in-plane orientation of the barrel of the vessel is low and the strength of the vessel is insufficient. In the case where the refractive index ni on the inner surface side is below the lower limit of formula (5), the residual strain in the barrel of the vessel is large and the deformation with time tends to increase.

The difference (no−ni) between the refractive index on the outer surface side and the refractive index on the inner surface side in formula (6) is found to have a close relation to the degree of the moderation of orientation of the resin on the inner surface side. In a vessel prepared from a preform according to the conventional preform outer surface-heating method, the value of (no−ni) is much larger than 0.020 and is generally in the range of from 0.030 to 0.060. In this vessel m the residual strain on the inner surface side is large and such a large shrinkage with time as 3% by volume or more is caused. In a vessel prepared from a preform according to the conventional preform inner surface and outer surface heating method where the inner surface side is heated at a high temperature, the value of (no−ni) is smaller than 0.010 and is generally in the range of from 0.005 to 0.000. In this vessel, the moderation of orientation of the resin on the inner surface side is too large, and the pressure-resistant strength is lower than ⅔ of that of the former vessel. In the present invention, by adjusting the value of (no−ni) within the above-mentioned range, such a high pressure-resistant strength as 16 kg/cm² or more can be attained while controlling the degree of the moderation of orientation of the resin on the inner surface side so that the shrinkage with time is lower than 3% by volume.

The crystallinity (X) referred to in the instant specification and appended claims is the value calculated from the density measured by using a density gradient tube according to the following formula:

$$X = \frac{\rho c}{\rho} \cdot \frac{(\rho - \rho am)}{(\rho c - \rho am)} \times 100 \quad (9)$$

wherein $\rho$ represents the density (g/cm³) of the sample, $\rho am$ represent the density of the amorphous portion (1.335 g/cm³ in case of PET), and $\rho c$ represents the density of the crystalline portion (1.455 g/cm³ in case of PET).

The crystallinity Xi of the resin on the inner surface side has a close relation to the pressure-resistant strength of the vessel. Namely, if Xi is larger than the upper limit of formula (7) or is smaller than the lower limit of formula (7), the pressure-resistant strength is lower than the pressure-resistant strength attained when Xi is within the range defined by formula (7). The reason is considered to be that in the former case, the moderation of orientation in the amorphous portion is too large and in the latter case, the crystal is not so sufficiently developed as to present the creep. Furthermore, if the crystallinity is so high that spherulites are formed, the impact resistance against falling or the like is reduced.

The crystallinity Xi of the resin on the inner surface side should be higher than the crystallinity Xo of the resin on the outer surface side and should satisfy the requirement represented by formula (8). In an inner pressure vessel such as a carbonated drink vessel, it is the resin on the inner surface side that is effective for preventing the creep. According to the present invention, by increasing the crystallinity of the resin on the inner surface side within a certain range, the pressure resistance can be increased. It is preferred that the value of (Xi−Xo) be in the range of 0 to 3%.

DETAILED DESCRIPTION OF THE PREFERRED EMBODIMENTS

In the present invention, thermoplastic polyesters composed mainly of ethylene terephthalate units, for example, PET and so-called modified PET formed by incorporating a small amount of other glycol such as hexahydroxylene glycol as the glycol component or s small amount of other dibasic acid such as isophthalic acid or hexahydroterephthalic acid as the dibasic acid component, can be used as the thermoplastic polyester. These polyesters can be used singly or in the form of blends with other resins such as nylons, polycarbonates and polyarylates.

A thermoplastic polyester having an intrinsic viscosity of at least 0.67 dl/g and a diethylene glycole unit lower than 2.0% by weight is preferablt used.

A bottomed preform used for the draw-blow-forming is prepared according to known means, for example, injection molding and pipe extrusion molding. According to the injection mold method, a melted polyester is injected and a bottomed preform having a neck portion, corresponding to a final vessel, is prepared in the amorphous state. The latter pipe extrusion molding method is advantageously utilized for preparing a bottomed preform having a gas-barrier intermediate resin layer of an ethylene/vinyl alcohol copolymer or the like. According to this method, an extruded amorphous pipe is cut, a neck is formed at one end by compression molding and the other end is closed to form a bottomed preform. In order to attain good engagement and sealing with a lid at a high temperature, only the portion to be formed into the neck of the final vessel can be thermally crystallinzed. Of course, this thermal crystallization can be performed at an optional stage after the preform-preparing step.

An optional heating mechanism can be used for the preliminary heating of the preform. For example, a heater as disclosed in Japanese Unexamined Patent Publication No. 63-306023 can be used as the inner heater, and an infrared ray heater can be used as the outer heater.

The draw-blow-forming of the preform can be carried out under known conditions except the above-mentioned limitations. It is preferred that the temperature of hot air to be blown into the preform be higher by at least 10° C. than the preform temperature (T), and it also is preferred that the draw ratio in the axial direction be 1.3 to 3.5, especially 1.5 to 3, and the draw ratio in the circumferential direction in the barrel be 2 to 5.5, especially 3 to 5.

EXAMPLE

The present invention will now be described in detail with reference to the following examples that by no means limit the scope of the invention.

In the examples, the following methods were adopted for determining the items and properties mentioned.

(1) Preform Temperature

Thermocouples were attached to the central part, in the height direction, of a preform on the inner surface and outer surface sides, and the temperature was measured. The temperatures of the outer and inner surfaces of the heated preform measured just before entrance into a hollow mold were designated as the temperatures of the inner and outer surfaces of the preform.

(2) Drawing Speed in Circumferential Direction by Blowing

A temperature sensor was attached almost to the center of the barrel of a bottle on the inner surface of a mold, and the time of from the start of blowing to the beginning of elevating of the temperature was measured. The drawing speed in the circumferential direction was calculated according to the following formula:

$$\text{Drawing speed} = \frac{\left[\frac{R}{r} - 1\right]}{\Delta t} \times 100 \ (\%/\text{sec})$$

wherein $\Delta t$ represents the measured time, r represents the average radius of the preform, and R represents the distance between the center line of the bottle and the temperature sensor-attaching position.

(3) Crystallinity

The wall surface of the bottle was shaved off into almost equal three pieces in the thickness direction by a cutter, and cut pieces on the outer and inner surface sides of the bottle were used as samples.

By using an n-heptane/carbon tetrachloride type density gradient tube (supplied by Ikeda Rika), the density of the sample was measured at 20° C. The crystallinity X was calculated from the measured density according to the following formula:

$$X = \frac{\rho c}{\rho} \cdot \frac{(\rho - \rho am)}{(\rho c - \rho am)} \times 100$$

wherein $\rho$ represents the density (g/cm³) of the sample, $\rho am$ represents the density of the amorphous portion (1.335 g/cm³ in case of PET), and $\rho c$ represents the density of the crystalline portion (1.455 g/cm³ in case of PET).

(4) Refractive Index

The refraction indexes ni and no of the inner and outer surfaces of a sample cut out from the bottle, in the thickness direction, were measured by using NaD rays as the light source and an Abbe refractometer as the refractometer according to the method of R. J. Samuels [Journal of Applied Polymer Science, Vol. 26, 1383 (1981)].

(5) Burst Strength

The bottle was filled with water, and a gradually increasing pressure was applied to the bottle. The pressure applied when the bottle was burst was measured and designated as the burst pressure.

(6) Shrinkage

Strain gauges (supplied by Kyowa Dengyo) were attached to the outer surface of the bottle in the circumferential and axial directions. The bottle was placed in an oven maintained at 60° C. for a hour, and the bottle was taken out and naturally cooled for 10 minutes. The shrinkage was measured by a static strain-measuring device.

Incidentally, bottles tested were those that had been stored in an atmosphere maintained at a temperature of 30° C. and a relative humidity of 80% for 1 day after the formation. The refractive index, crystallinity and shrinkage were measured at a position of about ¾ of the height of the bottle.

Figure 2:
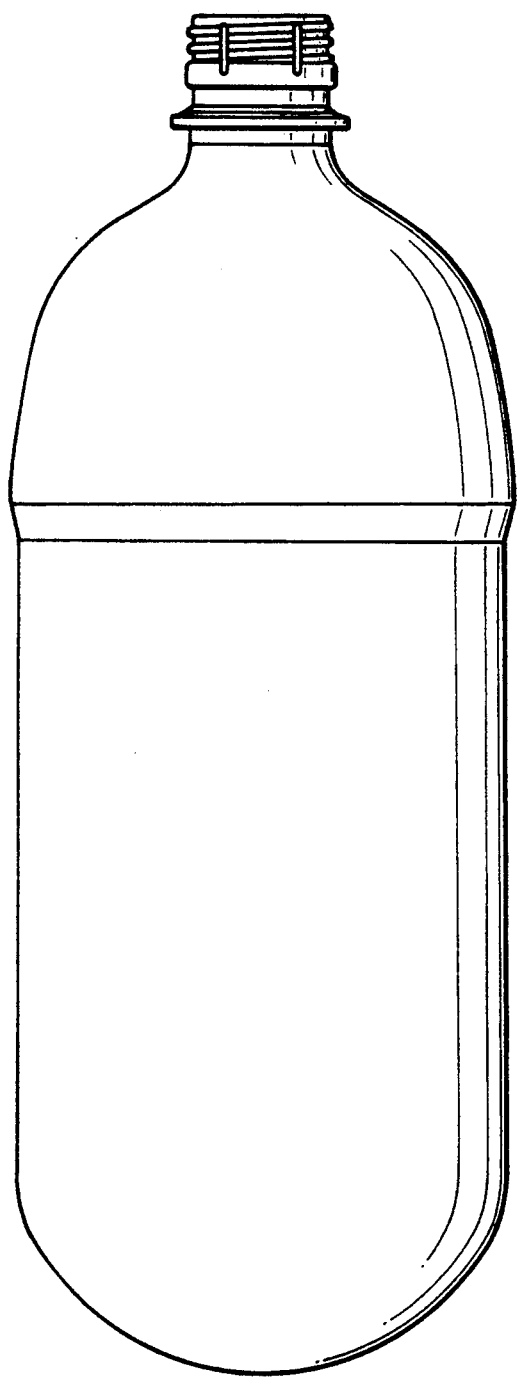

Any of known shapes can be adopted for the bottle of the present invention. For example, a shape as shown in FIG. 1 can be adopted, but in order to improve the pressure-resistant characteristics and impact resistance, a bottle having a bottom shape shown in FIG. 2 is preferable.

EXAMPLE 1

A polyethylene terephthalate preform (having a weight of 49 g) formed by injection molding was heated from the inner and outer sides and biaxially draw-blow-formed to obtain a bottle having an inner volume of 1.5 l (the average thickness of the barrel was 300 μm). The drawing deflection ratio (D) of the used preform was 32.3%, and when the drawing speed in the circumferential direction was measured according to the above-mentioned method, it was found that the drawing speed in the circumferential direction was 450%/sec. Various bottles were prepared in the same manner except that the inner and outer temperatures were changed by controlling inner and outer heaters. With respect to each of the obtained bottle, the refractive index in the thickness direction and the crystallinity were measured on the inner and outer surface sides. The obtained results are shown in Table 1.

In run a, since the temperature Ti of the inner surface side of the preform was too low, microcracks were formed by excessive drawing, and the bottle came to have a light pink tint and the transparency was reduced. Accordingly, also the burst strength was reduced.

In run b, since the refractive index no of the outer surface side in the thickness direction was large, the orientation was regarded as being small, but the crystallinity of the outer surface side was high. It is considered that since the preform temperature on the outer surface side was high, the crystallization was advanced but the molecular orientation was extremely moderated because the temperature was too high. Since the strength depends on the molecular orientation, the strength was influenced by this moderation on the outer side and the value of the strength was small.

In run d, the temperature on the inner side was higher. Since the draw ratio in the circumferential direction on the inner surface side was higher than on the outer surface side, this temperature gradient is generally considered to be an adequate temperature gradient. However, in the case where the drawing speed is very high as in this run d, internal heat generation is caused in the material by drawing, and the temperature is considerably high just after drawing, and therefore, it is expected that the temperature will be further elevated on the inner surface side where the draw ratio is high. As the result, promotion of the crystallization and moderation of the molecular orientation are caused, and especially, moderation of the molecular orientation exceeds a necessary level. This is preferable for the resistance to shrinkage with time but the strength is reduced. In contrast, in runs c and e, in anticipation of elevation of the temperature on the inner surface side by the above-mentioned heat generation, the preform temperature on the inner surface side was made a little lower than the preform temperature on the outer side, though the draw ratio on the inner surface side was higher than on the outer surface side. Furthermore, in the obtained bottle, the refractive index in the thickness direction on the inner surface side was smaller than on the outer surface side. Namely, the orientation was high and the crystallinity was high on the inner surface side, and values very close to each other were maintained on both the sides in this state. In other words, although the draw ratios in the circumferential direction on the inner and outer surface sides were greatly different from each other, the substantially same state was maintained on both the sides. This means that appropriated drawing was carried out, and the strength was higher than in other runs. Accordingly, it can be said that a highest effect was manifested by drawing in these runs.

EXAMPLE 2

The bottles obtained in runs a and e of Example 1 were placed in an oven maintained at 60° C. for 1 hour. The shrinkage caused by this operation was measured. The obtained results are shown in Table 2.

TABLE 1

| Run No. | Preform Temperature (°C.) | | | Refractive Index (-) in Thickness Direction | | | Crystallinity (%) | | | Burst Strength (kg/cm$^2$) |
|---|---|---|---|---|---|---|---|---|---|---|
| | outer side To | inner side Ti | To-Ti | outer side no | inner side ni | no-ni | outer side Xo | inner side Xi | Xi-Xo | |
| a | 94 | 77 | 17 | 1.538 | 1.490 | 0.048 | 26.5 | 21.3 | −5.2 | 13.2 |
| b | 106 | 87 | 19 | 1.545 | 1.493 | 0.052 | 30.6 | 24.0 | −6.6 | 15.1 |
| c | 96 | 95 | 1 | 1.514 | 1.496 | 0.018 | 24.6 | 25.7 | 1.1 | 17.2 |
| d | 93 | 110 | −17 | 1.505 | 1.500 | 0.005 | 28.5 | 32.0 | 3.5 | 13.7 |
| e | 100 | 92 | 8 | 1.510 | 1.494 | 0.016 | 29.0 | 30.3 | 1.3 | 19.0 |

TABLE 2

| Run | Shrinkage (%) circumferential direction | height direction |
|---|---|---|
| a | 0.39 | 0.52 |
| e | 0.13 | 0.20 |

From the results shown in Table 2, it is seen that the bottle obtained in run e was also excellent in the shrinkage resistance.

COMPARATIVE EXAMPLE 1

By using the same preform as used in Example 1, a bottle was formed by reducing the blowing pressure. The measurement results are shown in Table 3. The preform temperature was 102° C. on the outer surface side and 99° C. on the inner surface side.

TABLE 3

| Run No. | Drawing Speed (%/sec) in Circumferential Direction | Crystallinity (%) Xo | Xi | Xo-Xi | Burst Strength (kg/cm$^2$) | Shrinkage (%) in Circumferential Direction |
|---|---|---|---|---|---|---|
| f | 200 | 15.2 | 23.2 | −8.0 | 15.8 | measurement impossible because of too large shrinkage |

From the results shown in Table 3, it is understood that if the drawing speed is low, the shrinkage increases. If the drawing speed is low, internal heat generation by drawing is hardly caused, and the moderation of the molecular orientation by elevation of the temperature by spontaneous heat generation cannot be expected. Accordingly, the residual strain increases, resulting in increase of the shrinkage.

COMPARATIVE EXAMPLE 2

Heating of the preform was carried out only by the outer heater. The measurement results of the obtained bottle are shown in Table 4. When only the outer heater was used, it was very difficult to adjust the inner and outer temperatures of the preform within the ranges specified in the present invention. Accordingly, an appropriate relation was not established between the inner and outer temperatures of the preform and the draw ratio. Therefore, in the bottle obtain in run g, the burst strength and shrinkage resistance were degraded, and in the bottle obtained in run h, the burst strength was lower than in the bottles obtained in the examples of the present invention.

outer surfaces of a preform and utilizing skillfully and effectively internal heat generation caused at the draw-blow-forming step, a draw-blow-formed polyester vessel having a reduced shrinkage with time and a high pressure-resistant strength can be prepared. According to this process of the present invention, the time required for heating the preform can be shortened and draw-blow-forming can be preformed at a high speed, whereby the productivity of vessels can be greatly increased.

We claim:

1. A polyester vessel comprising a neck, a barrel and a closed bottom, which is prepared by draw-blow-forming of a thermoplastic polyester, wherein the inner surface and outer surface of the barrel have an orientation satisfying the following requirements:

$$1.500 \geq ni \geq 1.492,$$

and $$0.020 \geq no - ni \geq 0.010$$

wherein no represents the refractive index of the outer surface side of the barrel in the thickness direction, determined by using NaD rays, and ni represents the refractive index of the inner surface side of the barrel in the thickness direction, determined by using NaD rays, and a crystallinity satisfying the following requirements:

$$35\% \geq Xi \geq 20\%,$$

and $$3\% \geq Xi - Xo > 0\%$$

wherein Xo represents the crystallization degree of the outer surface side of the barrel, determined by the density method, and Xi represents the crystalli-

TABLE 4

| Run No. | Drawing Deflection Ratio (%) | Drawing Speed (%/sec) in Circumferential direction | Perform Temperature (%) outer side To | inner side Ti | To-Ti | Difference of Crystallinity (%) between Outer and Inner Sides | Burst Strength (kg/cm$^2$) | Shrinkage (%) in Circumferential Direction |
|---|---|---|---|---|---|---|---|---|
| g | 32.3 | 450 | 101 | 80 | 21 | −6.0 | 13.2 | 0.53 |
| h | 25.9 | 360 | 115 | 102 | 13 | −0.8 | 8.2 | 0.25 |

As is apparent from the results obtained in the examples, according to the present invention, by producing a specific temperature gradient between the inner and zation degree of the inner surface side of the barrel, determined by the density method.

* * * * *